G. H. STEVENSON.
Ditching Machine.
No. 77,930.
Patented May 12, 1868.
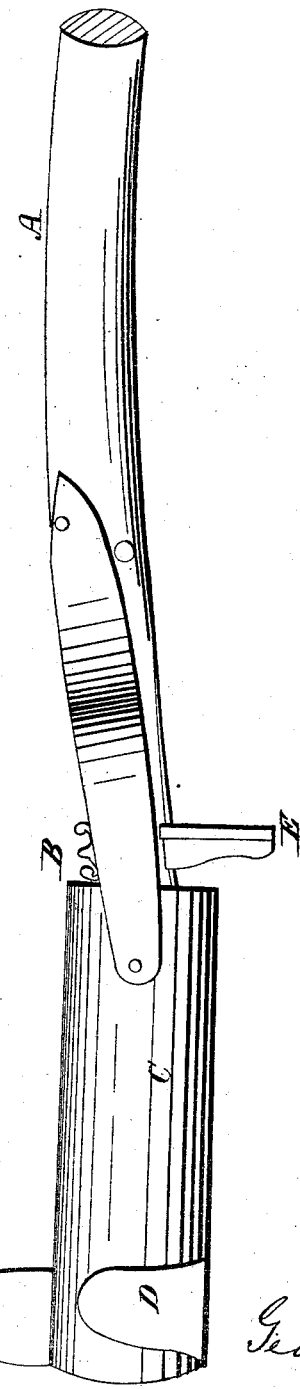

United States Patent Office.

GEORGE H. STEVENSON, OF WASHINGTON, OHIO.

Letters Patent No. 77,930, dated May 12, 1868.

IMPROVEMENT IN DITCHING-MACHINE.

*The Schedule referred to in these Letters Patent and making part of the same.*

Be it known that I, GEORGE H. STEVENSON, of Washington township, in the county of Clinton, and State of Ohio, have invented a new and useful Hand Tile-Ditching Spade for tile-ditching; and I do hereby declare that the following is a full, clear, and exact description of the construction and operation of the same, reference being had to the annexed drawings, making a part of this specification, and the letters of reference marked thereon.

The nature of my invention consists in constructing a spade that can be easily forced in the ground to the depth of fifteen inches or more, and by its peculiar construction so cramp the dirt that the operator can remove it without leaving any crumbs whatever in the ditch, thereby not making it ever necessary for him to get in the ditch to clean out the crumbs.

To enable others to make and use my invention, I will proceed to describe its construction and operation.

I construct the handle of my spade five feet long, of durable timber, in any of the known shapes, as shown at A in the drawing; and the blade, as shown at B, fifteen inches long and five inches wide, with an indentation, as shown at C; and a lip on each side of the blade at the point, as shown at D. These two constructions so cramp the dirt that the operator can remove all the space he cuts with the spade, (which is five inches square by fifteen deep,) without leaving anything behind. This is all made of steel.

The movable foot-piece, as shown at E, is made of iron, and small at one end, which passes through the handle, with tap or nut on the opposite side. There are two holes passing through the handle, as shown, one fifteen inches above the other, so that when the operator has cut the first through, or fifteen inches, he can then remove the foot-piece to the upper hole, and then cut the second fifteen inches as he did the first. This foot-piece is constructed for the foot to rest on, to assist in pushing down the spade.

The operator should set the spade, at each successive cut, five inches in advance of the succeeding one, and then fetch the spade back in the same direction as he pushed it in.

What I claim as my invention, and desire to secure by Letters Patent, is—

The construction of a spade that will cut a ditch ready for tile, thirty inches deep, without the use of any other instrument, and is useful for digging post-holes and many other useful things, which is done by the movable foot-piece and peculiar shape of the blade and lips attached thereon.

GEORGE H. STEVENSON. [L. S.]

Witnesses:
JOHN H. CHORMSEL,
JAMES B. ROWE.